United States Patent Office 3,476,532
Patented Nov. 4, 1969

3,476,532
METAL-CONTAINING COMPLEXES OF OXIDIZED POLYETHYLENE
Paul F. Hartman, Wayne, N.J., assignor, by mesne assignments, to Allied Chemical Corporation, New York, N.Y., a corporation of New York
No Drawing. Filed Nov. 25, 1964, Ser. No. 414,019
Int. Cl. C10l 7/02; C08f 47/08
U.S. Cl. 44—7                                    19 Claims

ABSTRACT OF THE DISCLOSURE

The present invention more particularly relates to novel and especially useful polyethylene complexes formed on heating of a mixture of a metal salt or metal complex with an oxidized polyethylene oxidized to the extent of containing between 0.2 to 7.5 weight percent chemically combined oxygen in the form of functional oxygen groups including by way of example, carbonyl, carboxyl, hydroxy, etc. The resulting complexed oxidized polyethylene is useful in a variety of applications including the production of inflammable elastic gels and greaselike compositions, waterproofing of textile fibers, and production of polyethylene foam and film.

---

This invention relates to a novel complexed product. More particularly this invention is concerned with a polymeric composition capable of being complexed at temperatures above the crystalline melting point of the polymer. The resultant complexed product can be used alone or as an additive in various processes as will be shown hereinafter.

One object of the instant invention is to provide a complexed oxidized polyethylene composition. Another object of the invention is to provide an additive for hydrocarbon oils which on addition thereto, causes the oil to form a grease or lubricant at temperatures up to 130° C. Still another object of the present invention is to provide a processing aid in the foaming of high density linear polyethylene which allows sufficient temperature processing latitude to foam polyethylene commercially. Yet another object of the instant invention is to provide a composition which on its addition to gasoline results in a napalm bomb. Still another object of the instant invention is to provide a processing aid in the biaxial orientation of high density linear polyethylene which allows the orientation step to be carried out at commercially attainable temperatures. Yet another object of the invention is to provide a complexed composition which is thermoplastic and workable by conventional means such as by any extrusion or molding operation. Other objects of the invention will in part be obvious and will in part appear hereinafter.

The above stated and other objects of the invention are obtained through the use of a polymeric composition comprising in admixture:

(a) An oxidized polyethylene having a total chemically combined oxygen content in the range 0.20 to 7.5 weight percent oxygen and (b) A complexing agent selected from the group consisting of metal salts, metal salts of fatty acids, the metals being at least divalent and the fatty acid moiety containing a least 8 carbon atoms, and metal complexes.

Complexing of the oxidized polyethylene occurs through the reaction of the complexing agents with the functional oxygen groups, e.g., carboxyl, carbonyl etc. on the oxidized polyethylene.

Examples of operable metal salts of fatty acids include, but are not limited to, aluminum monostearate, aluminum distearate, aluminium tristearate, aluminum hydroxystearate, aluminum palmitate, aluminum octoate, tin (II) oleate, tin (II) octoate and the like. Examples of metal salts operable in the instant invention include chromium chloride $CrCl_3 \cdot 6H_2O$, tin (II) chloride and the like. Operable examples of metal complexes useful in the instant invention include, but are not limited to, berryllium acetylacetonate, zinc acetylacetonate, aluminum acetylacetonate, ferric acetylacetonate, nickel acetylacetonate, magnesium acetylacetonate, calcium acetylacetonate, zirconium acetylacetonate, chromium acetylacetonate, titanium acetylacetonate and the like.

The polyethylene operable in the instant invention can be oxidized by various methods well known in the art. One method would include passing oxygen-containing gas into an oven over a solid polyethylene therein at a temperature below the melting point of the polymer. Still another method would be to suspend particles of polyethylene in water or an organic solvent and either bubble air through the suspension or pressurize the system with air at temperatures ranging up to the melting point of the polymer. Yet another method would be to pass an oxygen-containing gas, e.g., air or oxygen-enriched air at a temperature up to the melting point of the polymer through a fluidized bed of polyethylene particles. A further method would include pressing the polyethylene into film and thereafter passing hot air or other free oxygen containing-gas thereover at a temperature up to the melting point of the polymer.

In all of the aforesaid methods of oxidizing polyethylene, if desired, a minor amount, 0.05 to 5% by weight of the polyethylene of an organic peroxide, ozone, nitrogen tetroxide or other oxidation promoter may be blended with the polymer to eliminate the oxidation induction period and increase the oxidation rate. Superatmospheric pressure may be used, if desired, in any of the oxidation methods employed. In addition, it is also possible to oxidize polyethylene in the melt. One method of melt oxidation would include bubbling air or oxygen through a molten bath of polyethylene.

The polyethylene operable in this invention can be produced by many methods well known in the art, and include both high density polyethylene as claimed in U.S. Patent 2,816,883 and low density polyethylene as taught in U.S. Patent 2,153,553. Thus, polyethylene having densities in the range 0.91–0.980 g./cc. prior to oxidation are operable in the instant invention. Said polyethylenes have melting points ranging from 90° C. for the low density material up to 137° C. for high density polyethylene prior to oxidation.

Oxidation of polyethylene to obtain a total chemically combined oxygen content in the range 0.20 to 7.5 weight percent oxygen results in a polymer having the following range of oxygen-containing functional groups:

| Group | Range (milliequivalents/g. oxidized polyethylene) |
|---|---|
| Carboxyl | 0.0125–2.0. |
| Total carbonyl | 0.03–2.72 (0.13–7.6 wt. percent). |

The above described functional groups are the most important ones present in the oxidized polyethylene, in terms of chemical reactivity. Therefore, methods have been developed for measuring these groups in a quantitative fashion. However, in addition to these groups, other oxygen-containing species are known or believed to be present in the oxidized polyethylene in somewhat lesser concentrations. Examples of these other groups would be ethers (R—O—R), esters

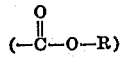

hydroxyl and anhydrides

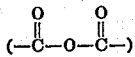

In order to measure quantitatively *all* of the oxygen present in the oxidized polyethylene, one must therefore resort to a direct elemental analysis of oxygen. In the products of this invention we have found by such direct analysis that the total chemically combined oxygen content ranges between 0.20 to 7.5 weight percent oxygen. Such measurement was made by the Unterzaucher method, as disclosed in Ber. 1940, 73, 391.

The extent of oxidation of the polyethylene was also determined by ascertaining the percent carbonyl of the oxidized polymer. This was done by measuring the intensity of infrared adsorption at 1720 cm.$^{-1}$ assuming an absorbance characteristic of ketone type carbonyl. In actuality, other carbonyl containing functions such as aldehyde, carboxylic acid and carboxylate ester also contribute to the 1720 cm.$^{-1}$ adsorption. Therefore the values reported as percent carbonyl represent a composite of all of these groups. Measurements were made on a Perkin-Elmer spectrophotometer, Model 221. The reported percent carbonyl is defined as $$\frac{\text{Grams C=O}}{\text{Grams polymer}} \times 100$$

As an alternate method, the extent of oxidation of polyethylene was determined by ascertaining the carboxyl content of the polymeric material by titration with base in the following manner. About 1 gram of the polymer to be analyzed was accurately weighed and dissolved in 100 ml. of xylene. By heating to 120–130° C. with stirring in a 500 ml. Erlenmeyer flask on a magnetic stirrer hot plate. About 10–20 of 0.1% thymol blue in absolute ethanol was added. While continuing stirring and maintaining the temperature at 120–130° C., the solution was titrated to a blue end point with standard 0.1 N potassium hydroxide in absolute ethanol.

Calculation:

$$\text{milliequivs. COOH per gram} = \frac{(\text{ml. of KOH})(N \text{ of KOH})}{(\text{gm. of polymer})}$$

Melt indices (MI) were measured under the conditions specified in ASTM D1238–57T under Condition E (melt index, i.e., MI) and Condition F (high load melt index, i.e., HLMI).

Densities of the polymer in g./cc. were measured under the conditions specified in ASTM D1505–57T.

Reduced specific viscosity, i.e., RSV, was obtained by dissolving 0.1 g. of the polymer in 100 cc. Decalin at 135° C. in accord with the procedure of ASTM D1601–61.

The crystalline melting point of the polymer was measured as the temperature at which birefringence disappears from the sample when viewed through crossed Nicol prisms in a hot stage microscope heated at a rate of less than 1° C./min.

The viscosity measurements were made with a Brookfield Viscometer Model LVT.

Unless otherwise noted, all parts and percentages are by weight.

In all runs, unless otherwise noted, the oxidized polymer was admixed with the complexing agent in a Bradender plastograph which was equipped with a recording unit for measuring changes in torque. The recording unit had a range of 0 to 1000 units, equal to a 0 to 1 meter-kilograms of torque. This range can be increased when necessary from 0 to 5000, i.e., equal to 0 to 5 meter-kilograms of torque by the addition of weight.

The degree of complexing obtained when the polyethylene composition containing the complexing agent is admixed in the plastograph is related to the increase in torque measured by the plastograph recorder. The greater the degree of complexing the greater the viscosity of the polyethylene composition which in turn requires a greater torque in order to drive the plastograph at a constant r.p.m. Another method employed to show the occurrence of complexing is the measurement of the melt index of the polymer before and after subjecting it to the complexing agent. Melt index varies with molecular weight. Since the process of complexing essentially produces an increase in molecular weight, a lower melt index after the complexing step evidences that complexing occurred.

The thermoplasticity of the complexed polyethylene product of the instant invention was shown by adding a weighed sample of the product to a known solvent therefor, e.g., xylene and allowing the solvent to reflux for 24 hours. If the product dissolved, the product was considered thermoplastic. Any undissolved portion was considered complexed to the extent that it was thermoset, demonstrated by a measurable gel content in the solvent.

The complexing step may be carried out in the melt or in solution.

In the complexed composition of the instant invention it is possible to vary the components of the composition within wide limits. Thus it is possible to have a weight ratio of oxidized polyethylene:complexing agent in the range 1:0.01 to 2 respectively. Preferably a 1:0.2 to 1 weight ratio is used.

The blending step is suitably performed by mechanically mixing the complexing agent into the oxidized polyethylene at temperatures at which the polymer is sufficiently soft to be worked. In the case of low density polyethylene, the temperature is about 90–125° C. while in the case of high density polyethylene, it is about 130–200° C. Higher temperatures are operable but are unnecessary. Suitable equipment for the blending step will include Brabender plastographs, Banbury mixers, two roll mills, injection molding machines, extruders and the like.

The complexed polyethylene composition of the instant invention has many and varied uses, which will be shown hereinafter.

Unless otherwise noted all parts and percentages are by weight.

EXAMPLE 1

Commercially available polyethylene having a density of 0.955, a melting point of 135° C., a reduced viscosity of 7.5 and a melt index of 0.0 was oxidized in air in a Stokes vacuum dryer for 9½ hours at a temperature of 120° C. The thus oxidized polyethylene on characterization had a melt index of 45, a melting point of 130° C., and contained 1.0 weight percent carbonyl, about 0.23 milliequivalents carboxyl/g. polymer and about 1.8 weight percent total chemically combined oxygen.

EXAMPLE 2

100 parts of the oxidized polyethylene from Example 1 were charged to a Brabender plastograph maintained at 150° C. and milled until molten as evidenced by a constant torque reading. Thereafter 5 parts of aluminum monostearate were added to the molten oxidized polymer and milling was continued for 10 minutes. The torque increased 2200 meter-gms. within 10 minutes after the aluminum monostearate was added. The complexed polymer on characterization had a melt index of 6.0.

EXAMPLE 3

Example 2 was repeated except that 10 parts of aluminum monostearate were added to the oxidized polyethylene. After a 15 minute milling period the torque increased 2650 meter-gms. The complexed product had a melt index of 2.0.

EXAMPLE 4

Example 2 was repeated except that 2.5 parts by weight of aluminum distearate were added to the oxidized polyethylene. After a 15 minute milling period the torque increased 2650 meter-grams. The complexed product had a melt index of 2.0.

EXAMPLE 5

Example 2 was repeated except that 2.5 parts by weight of aluminum tristearate was substituted for the aluminum monostearate. After a 10 minute milling period, the torque increased 900 meter-grams. The complexed polymer had a melt index of 26.0.

EXAMPLE 6

Example 5 was repeated except that 5 parts of aluminum tristearate were added to the molten polymer. After a 10 minute milling period, the torque increased 1300 meter-grams. On characterization the complexed polymer product had a melt index of 9.0.

EXAMPLE 7

Example 2 was repeated except that 5 parts by weight of aluminum hydroxystearate was substituted for the aluminum monostearate. After a 2 minute milling period the torque increased 1700 meter-grams. The complexed polymer had a melt index of 4.5.

EXAMPLE 8

Example 2 was repeated except that 5 parts by weight of aluminum palmitate was substituted for the aluminum monostearate. After a 4 minute milling period, the torque increased 2000 meter-grams. The complexed polymer had a melt index of 3.5.

EXAMPLE 9

Example 2 was repeated except that 5 parts by weight of aluminum octoate was substituted for the aluminum monostearate. After a 3 minute milling period, the torque increased 2000 meter-grams. The complexed product had a melt index of 2.3.

EXAMPLE 10

Example 2 was repeated except that 10 parts by weight of tin (II) oleate was substituted for the aluminum monostearate. After a 90 minute milling period the torque increased 2100 meter-grams. The melt index of the product was 2.8.

EXAMPLE 11

Example 2 was repeated except that 5 parts by weight of tin (II) chloride was substituted for the aluminum monostearate. After milling for 30 minutes the torque increased 2500 meter-grams. The melt index of the complexed polymer was 0.6.

EXAMPLE 12

Commercially available polyethylene having a high load melt index of 0.9, a density of 0.955, a reduced specific viscosity of 4.4, and a crystalline melting point of 135° C. was charged to a ribbon blender along with 0.5 weight percent benzoyl peroxide as an oxidation promoter and milled therein at 120° C. in air for 41 hours. The thus oxidized polymer had a melt index of 400, a reduced specific viscosity of 0.41, and contained 1.7 weight percent carbonyl and 0.47 milliequivalents carboxyl per gram of polymer. The total chemically combined oxygen content was 3.1 weight percent.

EXAMPLE 13

100 parts of the oxidized polyethylene from Example 12 were charged to a Brabender plastograph maintained at 150° C. and milled therein until molten. 7.5 parts of $CrCl_3 \cdot 6H_2O$ were added to the molten oxidized polymer and milling was continued for 2 minutes. During the 2 minute milling period the torque increased 3000 meter-grams. On characterization the complexed polymer had a melt index of 0.07 and a HLMI of 1.9.

EXAMPLE 14

Example 13 was repeated except that 2.5 parts by weight of $CrCl_3 \cdot 6H_2O$ was substituted for the 7.5 parts $CrCl_3 \cdot 6H_2O$. After a 2 minute milling period the torque increased 2500 meter-grams. On characterization the complexed polymer had a melt index of 1.45.

EXAMPLE 15

Example 13 was repeated except that only 1.25 parts by weight of $CrCl_3 \cdot 6H_2O$ was added to the molten polymer. After 2 minutes milling the torque increased 1000 meter-grams. The resultant complexed polymer had a melt index of 32.

EXAMPLE 16

Example 13 was repeated except that 7.5 parts Ti(O-stearyl)$_4$ was substituted for the $CrCl_3 \cdot 6H_2O$. After a 10 minute milling period the torque increased 1200 meter-grams. The complexed polymer on characterization had a melt index of 41.

EXAMPLE 17

To a 3 neck glass flask was charged 210 cc. xylene along with 10 parts by weight of oxidized polyethylene from Example 12 and 1 part by weight $CrCl_3 \cdot 6H_2O$ in 30 cc. acetic acid. The mixture was heated at 110° C. for 1 hour. The complexed polymer was removed from the solution by cooling and filtering and washed and dried thereafter. On characterization the complexed polymer had a high load melt index of 1.3.

To show the necessity of oxidizing the polyethylene prior to admixing it with the complexing agent to obtain complexed polyethylene the following run was made.

EXAMPLE 18

100 parts of commercially available polyethylene having a density of 0.95, a melting point of 135° C., a reduced specific viscosity of 2.0, an oxygen content of less than .01 weight percent and a melt index of 1.0 were charged to a Brabender plastograph maintained at 150° C. and milled therein until molten. 5 parts of aluminum distearate were added to the molten polyethylene and milling was continued for 30 minutes. No increase in torque was noted after the addition of the aluminum distearate. On characterization the polyethylene had a melt index of 1.0. Thus, it is necessary to oxidize the polymer for a complexing reaction to occur with the complexing agents of the instant invention.

The following examples will show the utility of the complexed product of the instant invention as an additive to obtain a grease or lubricant from hydrocarbon oils.

EXAMPLE 19

12.5 parts of oxidized polyethylene having a density of 0.99, an acid number of 27, a melt index of 450 and a total oxygen content of 3.4 weight percent were charged to a glass beaker containing 250 parts mineral oil having a viscosity of 182 centipoises at 23° C. The beaker was heated to 115° C. to dissolve the oxidized polymer in the mineral oil. 12.5 parts of aluminum stearate was then added to the beaker containing the dissolved polymer. Within 5 minutes the mixture formed an elastic gel and remained as such at temperatures in the range 80–130° C. On cooling the gel to room temperature, 25° C., a grease was obtained. The grease contained no visible particles of oxidized polyethylene.

A comparative study of the various additives and the effect thereof on viscosity is shown in Table I. It is to be noted therein that although the aluminum complexing agent per se affords some increase in viscosity, oxidized polyethylene per se does not appreciably increase the viscosity of hydrocarbon oil. However, when oxidized polyethylene is used in conjunction with the complexing agents of the instant invention an enormous increase in viscosity is obtained.

In the examples in Table I the procedure employed was to heat the hydrocarbon oil wtih agitation at a temperature sufficient to dissolve the oxidized polyethylene, about 130° C. and add the oxidized polymer thereto. The polymer was dissolved, agitation was continued and the complexing agent, i.e., aluminum tristearate was added to the hydrocarbon oil.

In Examples 23 and 25, on cooling the grease to room temperature, no visible particles of oxidized polyethylene were observed and the grease was not pourable.

The viscosity of the solution was measured with a Brookfield Viscometer Model LVT at 20 r.p.m. at the various temperatures.

of the same size and characteristics. In both cases the solvent was evaporated and the swatches were subjected to 10 washing and drying cycles. The washing cycle consisted of washing the swatches in a 3 lb. load with 30 g. of a detergent sold under the tradename "Tide" by Procter and Gamble Co. and water at 85–96° C. in a Sears Roebuck automatic washer (Model No. 110–5915610) using the delicate fabric setting having a sudsing time of 4 minutes in the complete 17 minute washing cycle. The swatches were dried in a Sears Roebuck gas dryer (Model 6107502) for 18 minutes (hot setting) at an air temperature of about 84° C. at the dryer exhaust. The swatches were then clamped in 10" x 10" picture-type frames and placed in the center of a rectangular stainess steel tank, 10" x 20" x 10" as a vertical divider. The half of the tank adjacent the side of the swatch which had been waterproofed was filled with water and the time required for water to permeate through the switch to the other half of the tank was measured. The average time required for the swatches waterproofed with oxidized polyethylene and aluminum tristearate to permeate through the swatch was 1.6 hours whereas the control swatches containing only aluminum tristearate were permeated in an average time of 3 minutes.

TABLE I.—VISCOSITY (CENTIPOISES) OF VARIOUS COMPOSITIONS AT ELEVATED TEMPERATURES

| Example No. | Composition (parts by wt.) | Temperature ° C. | | | | | | | | | | | |
|---|---|---|---|---|---|---|---|---|---|---|---|---|---|
| | | 30 | 40 | 50 | 60 | 70 | 80 | 90 | 100 | 110 | 120 | 130 | 140 |
| 20 | 300 Mineral oil [1] | | | | | | 26 | 24 | 22 | 21 | 19 | | |
| 21 | 250 Mineral oil; [1] 6.25 oxidized polyethylene | | | | | | 33 | 28 | 21 | 21 | 15 | 14 | 12.5 |
| 22 | 250 Mineral oil; [1] 7.0 aluminum tristearate | | | | | | 400 | 206 | 180 | 120 | 80 | 52 | 50 |
| 23 | 250 Mineral oil; [1] 6.25 oxidized polyethylene; [2] 7.00 aluminum tristearate | | | | | | 118 | 180 | 1,700 | 5,000 | 2,800 | 1,700 | 1,000 |
| 24 | 250 Decalin; 6.25 oxidized polyethylene [1] | 12 | 12 | 12 | 12 | 12.5 | 14 | 14 | 14 | 10 | 10 | 10 | 10 |
| 25 | 250 Decalin; 6.25 oxidized polyethylene; [2] 7.00 aluminum tristearate | 1,900 | 5,000 | 9,000 | 19,000 | 40,000 | 80,000 | 80,000 | 32,000 | 9,000 | 7,100 | 2,000 | 550 |

[1] Mineral Oil having a viscosity of 182 cps. at 23° C.
[2] Oxidized polyethylene, 3.4 wt. percent oxygen, density 0.99 g./cc., melt index 450.

As can be seen from Table I, it is not necessary to add large amounts of the complexed additive to the hydrocarbon oils in order to obtain an appreciable increase in viscosity even at elevated temperatures. However the amount added can be varied between wide limits. A practical range within the operable range would be 1–30 weight percent additive, preferably 2–20 weight percent additive, based on the weight of the material to which it is added.

Example 23 was repeated except that the same amount of aluminum monostearate, aluminum distearate, and aluminum octoate, and 1 part by weight nickel acetylacetonate respectively were substituted for the aluminum tristearate. In all cases a comparable increase in viscosity resulted.

The following example shows the operability of using the complexed polymer additive of the instant invention in water-proofing natural and synthetic textile fibers, e.g., wool, cotton, rayon, "Dacron," "Orlon," nylon, etc.

EXAMPLE 26

To a stirred beaker containing 500 parts by weight of xylene was added 6.25 parts of oxidized polyethylene having a density of 0.99, a melt index of 450, and a total weight percent oxygen of 3.4. The mixture was heated at 140° C. until the polymer was dissolved therein. 6.25 parts by weight of aluminum tristearate was added to the mixture and within 1 minute a gel was formed. The gel was cooled to room temperature and applied by means of a roller to 6 nylon swatches, 12" x 12". The nylon swatches had a weave of two up and one down right twill. The warp yarn was singles, 40 denier, 13 filament, with 6–8 turns of Z twist, the filling yarn was singles, 70 denier, 34 filament, with 2–3 turns of Z twist. The weight percent add on of gel was 5% but can be varied within the operable limits of 2–15%. A control run consisting of 500 parts mineral oil and 6.25 parts of aluminum tristearate without any oxidized polyethylene being present was also admixed and applied with a roller to six nylon swatches Another example of utility for the complexed composition of the instant invention is in the production of foamed products.

It is known that polyolefins, especially high density linear polyethylene, are very difficult to foam into uniform products. Temperature control is very critical in a foaming operation in order to obtain continuous processability. The temperature employed in foaming polyethylene should be above the melting point of the polymer and also above the decomposition temperature of the blowing agent. The amount of blowing agent used in foaming operations is 0.5 to 10, preferably 2 to 6 weight percent of the polymer to be foamed. However, the temperature should be less than that at which the hot foamed product will immediately collapse due to channeling of the gas bubbles from the decomposed blowing agent. The foamed product resulting from the foaming operation should have cells of small diameter relative to their number in a given cross section. Said cells should be discrete or unicellular (not interconnected) and should be distributed uniformly throughout the polymer to provide uniform insulating and mechanical properties. In addition, the foamed product should have a smooth surface instead of a rough surface caused by broken bubbles. A further factor to be taken in consideration on foaming is the density of the material. Ordinarily, a theoretical density is calculated for the blowing agent employed and for optimum results, the actual density of the material should be in line with the theoretical density.

It has now been found that the use of the complexed polyethylene composition of matter of the instant invention as a processing aid in foaming polyethylene results in a product of low density which is readily processed and has a small uniform cell structure and a smooth finish as shown in the following example.

EXAMPLE 27

100 parts by weight of commercially available polyethylene having a density of 0.95, a melt index of 0.4 were admixed with 2 parts by weight of a known blowing agent, i.e., Celogen AZ, 5 parts by weight of oxidized polyethylene having a density of 0.99, a melt index of 0.2 and a weight percent oxygen of 3.4% and 2 parts by weight of aluminum tristearate. The entire mixture was ground in a Wiley mill for 5 minutes to obtain particles of about ¼" diameter. The ground mixture was then fed to the hopper of a 1" MPM extruder of 20/1 L/D ratio with a 3 hole filament die (0.04" diameter of die). The extruder barrel was maintained at a temperature in the range 350–400° F. during a 4 to 5 minute residence period in the barrel. The polymer was extruded through the three hole filament die at a die temperature of 280–300° F. and immediately cooled to a temperature of at least 260° F. upon leaving the die. The resultant foamed product was of uniform cell size (average diameter=0.02") and had a smooth exterior surface. The thus foamed polymer had a density of 0.30 grams per cc.

A controlled run consisting of 100 parts of commercially available polyethylene having a density of 0.95 and a melt index of 0.4 and 2 parts of Celogen AZ without any aluminum tristearate or oxidized polyethylene being present resulted in a foamed product having an average cell diameter of 0.04", and a density of 0.65 grams per cc. The resultant foam product had a rough exterior surface and the cells were not uniform in size.

Another control run consisting of a mixture of 100 parts of commercially available polyethylene having a denstiy of 0.95 and a melt index of 0.4; 2 parts of Celogen AZ and 2 parts of aluminum tristearate resulted in a foam having a density of 0.48 and an average cell diameter of 0.01". The surface of this control foam was smooth.

A control run consisting of 100 parts of commercially available polyethylene having a density of 0.95 and a melt index of 0.4; 2 parts of Celogen AZ and 4 parts of an oxidized polyethylene having a density of 0.99, a melt index of 0.2 and a total oxygen content of 3.4 weight percent was carried out as in Example 27 supra. The resultant foamed product had a density of 0.31 gram per cc. and an non-uniform cell structure having an average cell diameter of 0.03".

A comparison of the runs in Example 27 shows that polyethylene per se when foamed in the presence of a blowing agent (Celogen AZ) results in a foamed product having a non-uniform large diameter cell size, a relatively high density and a rough surface. The addition of solely oxidized polyethylene thereto decreases the density and the cell size but does not have any effect on the non-uniformity of the cell size or the rough external surface. The addition of a complexing agent to polyethylene and a blowing agent decreases the cell size even more than oxidized polyethylene and also results in a uniform cell size and a smooth external surface. However, the density of the foamed product is greater than that obtained by the addition of oxidized polyethylene per se. The addition of the combination of oxidized polyethylene and complexing agent, e.g., aluminum tristearate, yields a foamed product with all the desired characteristics, i.e., low density, uniform small diameter cell size and a smooth external surface.

The following example shows the operability of the instant invention when the oxidized polyethylene and the complexing agent are premixed prior to be added to the polyethylene to be foamed.

EXAMPLE 28

2 parts by weight of oxidized polyethylene having a density of 0.99, a melt index of 450 and a total weight percent oxygen of 3.4% was admixed with 2 parts by weight of aluminum tristearate in a Brabender plastograph at 150° C. to complex the polymer. The complexed oxidized polymer was then blended with 100 parts by weight of commercially available polyethylene having a density of 0.95 and a melt index of 0.4 and 2 parts by weight of Celogen AZ in a Wiley mill for a period of about 5 minutes to obtain particles of a maximum diameter of ¼". The mixture was then fed to the hopper of a 1" MPM extruder of 20/1 L/D ratio for extrusion through a 3 hole filament die with a hole diameter of 0.04" as in Example 27. After following the procedure of Example 27, the resultant foam product had a density of 0.20 gram per cc. (theoretical density of 0.18 g./cc.) and contained uniform cells having an average diameter of 0.01". The exterior surface of the foamed product was smooth.

Repeating this example except that 3.2 of oxidized polyethylene and 0.8 part aluminum tristearate was used resulted in a foam product having a density of 0.24 g./cc. (theoretical density 0.18 g./cc.) and a uniform cell structure having an average diameter of 0.01". The exterior surface of the foamed product was smooth.

It is also possible by the use of the instant invention to dye polymers which heretofore have not been readily susceptible to dyeing. Examples of such polymers are polypropylene and polyethylene. The following examples show the operability of the complexed polymer composition of the present invention to dye these polymers.

EXAMPLE 29

100 parts of commercially available polypropylene having a density of 0.904 and a melting point of 168° C. were charged to a Brabender plastograph and milled therein until molten at 200° C. 2 parts of oxidized polyethylene having a total oxygen content of 3.4 weight percent and 2 parts of chromium chloride were added to the Brabender plastograph and milled into the polypropylene. The polymer was removed after 10 minutes of milling and sheeted out to a film (5.0 mil thickness) in a platen press. One side of the film was coated with a 156 cps. solution of No. 501 R.P.I. white ink (the solvent used was 80/20 isopropyl alcohol/n-propyl acetate). The ink coating was applied with a 120 line/sq. in. anilox I.P.I. ink roll. The film sample after coating was placed in an oven for 1 hour to dry at 160° F. After drying the film sample was removed and subjected to the "Scotch" tape adhesion test. The "Scotch" tape adhesion test consists of applying "Scotch" tape firmly to the inked portion of the film and thereafter removing same quickly by bending the tape back at an angle of approximately 180°. In this example less than 5% of the ink was removed by the "Scotch" tape test.

A control run following the same procedure using the same polypropylene without any oxidized polyethylene and aluminum acetylacetonate result in greater than 80% of the ink being removed by the "Scotch" tape test.

EXAMPLE 30

100 parts of a commercially available oxidized polyethylene having a density of 0.98, a melt index of 400 and containing 0.48 milliequivalents carboxyl per gram and having a total oxygen content of 3.4% was reacted on a two roll mill at 300° F. with 2.5 parts of chromic chloride for a period of 10 minutes to yield the complexed polymer. 10 parts of said complexed polymer were blended with 100 parts of a commercially available polyethylene having a density of 0.96 and a melt index of 1.0 on a Brabender plastograph. The mixture was removed after 10 minutes of milling and sheeted out into a film of 5.0 mil thickness in a platen press. One side of the film was coated with Flexotuf Red T-3409 ink from IPI, a division of Inter-Chemical Co. The ink coating was applied with a 120 line/sq. in. anilox I.P.I. ink roll. The film sample after coating was placed in an oven for one hour to dry at 160° F. After drying the film sample was subjected to the "Scotch" tape test as set out above in Example 29. Less than 3% of the ink was removed by the "Scotch" tape test. A control run on a commercially available polyethylene having a density of 0.96 and a melt index of 1.0 resulted in almost complete removal of the ink by the "Scotch" tape test.

EXAMPLE 31

Example 30 was repeated except that the ink used was an S.P.I. Standard Flexographic Ink No. 2 from Del Val Ink & Color Co., Pennsauken, N.J. Less than 5% of the ink was removed by the "Scotch" tape test.

This example was repeated except that commercially available polypropylene having a density of 0.904 and a melting point of 168° C. was used. Less than 5% of the ink was removed therefrom by the "Scotch" tape test.

Another use for the complexed polymer composition of the instant invention is in napalm bombs as shown by the following example.

EXAMPLE 32

10 parts by weight of oxidized polyethylene having a density of 0.99, a melt index of 450 and a total weight percent oxygen of 3.4% were charged to a pressurized reactor along with 5 parts of aluminum naphthanate and 5 parts of aluminum palmitate. The reactor was sealed and blanketed with nitrogen. 100 parts by weight of gasoline were charged to the reactor and the reactor was heated to 110° C. under 300 lbs. nitrogen pressure. After 20 minutes at 110° C. the reactor was cooled down. The resultant product was an inflammable elastic gel.

Still another use for the complexed polymer composition of the instant invention is in the production of blown polyolefin film, especially polyethylene.

It is known in the art, especially in a case of high density linear polyethylene which contains very few chain branches, that film of said material can not be simultaneously biaxially oriented in an inflated extruded tube or bubble process without first crosslinking the polymer in order to be able to obtain an uniform melt viscosity at the temperatures at which the film is oriented. If the film is not crosslinked, temperature control while biaxially orienting is extremely critical and is limited to variations of about 1 to 2° C. Thus, in biaxially orienting high density linear polyethylene by the bubble technique if the temperature increases 1 to 2° C., the melt viscosity decreases to the extent that the bubble will rupture. If the temperature decrease about 1 or 2° C., the bubble will burst as it is not rubbery enough to withstand the build up in air pressure inside the bubble. As said heretofore this short coming can be overcome by chemically crosslinking the polymer which causes the bubble to become more rubbery and thus allows for less stringent temperature control. It has now been found that the addition of the complexed polymer composition of the instant invention acts like a physical crosslinking agent which increases the melt viscosity to a point where temperature control can be varied within 10° C., thus allowing for continual commercial production of biaxially oriented high density linear polyethylene by the bubble technique. The following example shows such a system.

EXAMPLE 33

100 parts by weight of commercially available polyethylene having a density of 0.96, a melt index of 5.0 and a melting point of 128° C. were charged to a Brabender plastograph along with 5 parts by weight of oxidized polyethylene having a density of 0.99, a melt index of 450 and a total oxygen content of 3.4 weight percent and 5 parts by weight of chromium chloride ($CrCl_3 \cdot 6H_2O$). The admixture was milled at 150° C. until a constant torque was obtained. The material was removed from the plastograph and sheeted out into film of 15 mil thickness on a platen press. The film samples were cut into 3″ x 3″ squares on cooling. A sample of the high density linear polyethylene blended with the oxidized polyethylene and chromium chloride was biaxially oriented by clamping the sample between two horizontal plates, the top plate having a 2½″ diameter cut out portion in the center thereof through which the sample is stretched by air blowing in a closed pressure system. The bottom plate has adjacent the sample a recessed portion of the same diameter and in alignment with the cut out portion in the top plate into which a measured amount of pressurized air is admitted to cause the sample to biaxially orient by blowing. Prior to blowing the sample was heated to 120° C. and blown at a biaxial orientation temperature of 120° C. under an air pressure of 1 p.s.i. for 0.5 second. The resultant blown film had a 4.82× linear expansion and a thickness of 0.64 mil.

The example was repeated except that the biaxial orientation temperature was 125° C. The resultant blown film had a 5.14× linear expansion and a thickness of 0.59 mil.

The above example was repeated except that the biaxial orientation temperature was 130° C. The resultant film had a linear expansion of 5.30× a thickness of 0.54 mil.

To show the inoperability of blowing high density linear polyethylene per se by the bubble method over a relatively wide temperature range to biaxillay orient same, the following control runs were performed.

Commercially available high density linear polyethylene having a density of 0.960, a melt index of 5.0, and a melting point of 128° C. was formed into film of 15 mil thickness and biaxially oriented as in Example 33. On biaxially orienting the film at a temperature of 120° C., the film burst immediately without any appreciation in volume.

On biaxially orienting the polyethylene film at a temperature of 125° C. the resulting biaxially oriented film had a 4.92× linear expansion and a film thickness of 0.62 mil.

On biaxially orienting the linear high density polyethylene film at a temperature of 130° C. the film burst immediately without any appreciable increase in volume.

The above examples show the ability of increasing the processability of the high density linear polyethylene by allowing one to biaxially orient said film over an appreciable temperature range as compared to high density linear polyethylene per se.

The above biaxially oriented films were subjected to shrinking at various temperatures in ethylene glycol. A 2′ x 2′ square sample was cut out of the blown film and dipped in ethylene glycol for 15 seconds.

$$\text{The percent shrink} = \frac{\text{Length}_{\text{original}} - \text{Length}_{\text{final}}}{\text{Length}_{\text{original}}} \times 100$$

The composition of polyethylene, oxidized polyethylene and chromium chloride will be designated Composition A. The composition of polyethylene per se will be designated Composition B in Table II. The results of percent shrink at various temperatures are reported in Table II.

TABLE II

| Composition: | Orienting temp., ° C. | Ethylene glycol shrinking temp., ° C. | Percent shrink |
|---|---|---|---|
| A | 120 | 110 | 4.0 |
|   |     | 120 | 18.0 |
|   |     | 125 | 40.0 |
|   |     | 130 | 75.0 |
| A | 125 | 110 | 5.0 |
|   |     | 120 | 20.0 |
|   |     | 125 | 45.0 |
|   |     | 130 | 79.0 |
| A | 130 | 110 | 6.0 |
|   |     | 120 | 22.0 |
|   |     | 125 | 47.0 |
|   |     | 130 | 81.0 |
| B | 125 | 110 | 5.0 |
|   |     | 120 | 19.0 |
|   |     | 125 | 40.0 |
|   |     | 130 | 74.0 |

The oxidized polyethylene complexing agent compositions of the instant invention may include other additives which do not interact directly with the oxidized polymer or the complexing agents. Such additives are well known to those skilled in the art. By such additives is meant the inclusion of plasticizing, lubricating, extending, filling, e.g., carbon black, stabilizing, flame retarding and coloring ingredients such as dyes and pigments and also antioxidants, antistatic materials and the like. The choice of such additives would be obvious to one skilled in the art.

The total oxygen content limits of the oxidized polyethylene, i.e., 0.2 to 7.5 weight percent resulted from a determination that amounts less than the lower limit did not render sufficient complexing to obtain improved properties. On the other hand, to obtain an oxygen content in excess of the upper limit by oxidation, degraded the polymer molecular weight to such an extent that subsequent complexing did not return it to even its original properties prior to oxidation.

The following examples in Table III show comparative physical properties of oxidized polyethylene after reacting same with varying amounts of a complexing agent, i.e., chromium chloride ($CrCl_3 \cdot 6H_2O$). In all the examples in Table III, 100 parts of the oxidized polyethylene along with the stated weighed amount of complexing agent were charged to a Brabender plastograph and reacted therein at 150° C. for 20 minutes. To measure tensile properties of the resultant complexed polyethylene, i.e., tensile stress at failure, and percent elongation at failure, the complexed polymer pressed in film form (15–25 mils thick) was cut to ¼" sample strips placed in the jaws (1" apart) of a tensile strength tester (Instron, Model TT, available from Instron Engineering, Inc., Quincy, Massachusetts) and separated at a rate of 2" per minute and a strain rate of 200% per minute at 23° C. and 50% relative humidity. The resultant data is shown in Table III.

TABLE III

| | Oxidized Polyethylene | | | | Complexed Polymer Product | | |
|---|---|---|---|---|---|---|---|
| Example No. | Wt. percent oxygen | Density; g./cc. | Melt index | $CrCl_3 \cdot 6H_2O$ parts/100 parts | Melt index | Tensile (p.s.i.) | Elongation |
| 34 | 3.4 | 0.98 | 860 | 0 | 860 | 1,440 | 0.0 |
| 35 | 3.4 | 0.98 | 860 | 6.25 | 0 | 3,150 | 32.0 |
| 36 | 3.4 | 0.98 | 860 | 7.5 | 0 | 2,930 | 38.0 |
| 37 | 3.1 | 0.957 | 10,000 | 6.25 | 0 | 2,295 | 36.0 |
| 38 | 3.25 | 0.968 | 2,935 | 6.25 | 0 | 2,135 | 57.0 |

To show that the metals in the metal salts and metal complexes of the complexing agent must be at least divalent the following examples were performed.

EXAMPLE 39

100 parts of commercially available oxidized polyethylene having a total oxygen content of 3.4 weight percent and a melt index of 400 were charged to a Brabender plastograph maintained at 150° C. and milled until molten as evidenced by the constant torque reading. Thereafter 5 parts of sodium oleate were added to the molten oxidized polymer and milling was continued for 20 minutes. No change in torque was registered on the plastograph recorder after the addition of the sodium oleate. The polymer on characterization had a melt index of 400.

EXAMPLE 40

100 parts of commercially available oxidized polyethylene having a melt index of 45 and a total oxygen content of 1.6 weight percent were charged to a Brabender plastograph maintained at 150° C. and milled until molten as evidenced by a constant torque reading. Thereafter 5 parts of LiCl were added to the molten polymer and milling was continued for 20 minutes. No increase in torque was registered after the addition of the LiCl. The polymer on characterization had a melt index of 46.

From Examples 39 and 40 it can be seen that it is necessary that the metals be at least bivalent to be operable in the instant invention to complex the polymer.

What is claimed is:

1. Composition useful in the production of complexed oxidized polyethylene consisting essentially of oxidized polyethylene having a total chemically combined oxygen content in the range 0.20 to 7.5 weight percent and a complexing agent selected from the group consisting of chromium chloride and tin (II) chloride.

2. The composition according to claim 1 wherein the complexing agent is chromium chloride.

3. The composition according to claim 1 wherein the complexing agent is tin (II) chloride.

4. Complexed oxidized polyethylene produced by mixing oxidized polyethylene having a total chemically combined oxygen content in the range 0.20 to 7.5 weight percent and 1 to 200 percent by weight of said oxidized polyethylene of a complexing agent selected from the group consisting of chromium chloride and tin (II) chloride.

5. Complexed oxidized polyethylene according to claim 4 wherein the complexing agent is chromium chloride.

6. Complexed oxidized polyethylene according to claim 4 wherein the complexing agent is tin (II) chloride.

7. A composition useful in the production of a grease consisting essentially of a hydrocarbon oil and an additive consisting essentially of oxidized polyethylene having a total chemically combined oxygen content in the range 0.20 to 7.5 weight percent and a complexing agent selected from the group consisting of metal salts and metal complexes, the metal in said complexing agents being at least bivalent, the weight ratio of oxidized polyethylene:complexing agent in the additive being in the range 1:0.01 to 2 respectively, the additive being present in the composition in an amount equal to 1 to 30 weight percent based on the weight of the hydrocarbon oil.

8. The composition according to claim 7 wherein the metal salt is a member of the group consisting of aluminum stearate, aluminum distearate, aluminum tristearate, aluminum octoate, aluminum hydroxystearate, aluminum palmitate, tin (II) oleate, tin (II) octoate, tin (II) chloride, and chromium chloride.

9. The composition according to claim 7 wherein the metal complex is a member of the group consisting of berryllium acetylacetonate, zinc acetylacetonate, aluminum acetylacetonate, ferric acetylacetonate, magnesium acetylacetonate, calcium acetylacetonate, zirconium acetylacetonate, chromium acetylacetonate, titanium acetylacetonate and nickel acetylacetonate.

10. The process of forming a grease which comprises adding to a hydrocarbon oil, 1 to 30 weight percent based on the weight of the hydrocarbon oil of an additive consisting essentially of oxidized polyethylene having a total chemically oxygen content in the range 0.20 to 7.5 weight percent and a complexing agent selected from the group consisting of metal salts and metal complexes, the metals in said complexing agents being at least bivalent, the weight ratio of oxidized polyethylene:complexing agent in the additive being in the range 1:0.01 to 2 respectively, while maintaining said hydrocarbon oil at a temperature sufficient to dissolve the oxidized polyethylene therein, and thereafter cooling the thus formed grease.

11. The process according to claim 10 wherein the hydrocarbon oil is mineral oil.

12. The process according to claim 10 wherein the hydrocarbon oil is Decalin.

13. Textile fiber coated with 1–30 weight percent of said textile fiber of an additive consisting essentially of a complexed oxidized polyethylene having a total chemically combined oxygen content in the range 0.20 to 7.5 weight percent, the complexing agent being selected from the group consisting of metal salts and metal complexes, the metals in said complexing agents being at least bivalent, the weight ratio of oxidized polyethylene:complexing agents being in the range 1:0.01 to 2 respectively.

14. A process for water-proofing a textile fiber which comprises applying to a textile fiber at a temperature ranging from 20–140° C. a gel in a 2–15 weight percent add on formed by adding an additive consisting essentially of oxidized polyethylene having a total chemically combined oxygen content in the range of 0.20 to 7.5 weight percent and a complexing agent selected from the group consisting of metal salts and metal complexes, the metal in said complexing agents being at least bivalent, the weight ratio of oxidized polyethylene:complexing agent in said additive being in the range 1:0.01 to 2 respectively to a solvent for said oxidized polyethylene at a temperature sufficient to dissolve said oxidized polyethylene in said solvent, said additive being present in an amount equal to 1 to 30 weight percent based on the weight of the solvent for said oxidized polyethylene.

15. A composition useful in the production of foamed polyethylene consisting essentially of (a) polyethylene, (b) 0.5 to 10 weight percent of a foaming agent based on the weight of said polyethylene, and (c) 1–30 weight percent based on the weight of said polyethylene of an additive consisting essentially of oxidized polyethylene having a total chemically combined oxygen content in the range 0.20 to 7.5 weight percent and a complexing agent selected from the group consisting of metal salts and metal complexes, the metal in said complexing agents being at least bivalent, the weight ratio of oxidized polyethylene:complexing agent in the additive being in the range 1:0.01 to 2 respectively.

16. The process of forming foamed polyethylene which comprises admixing (a) polyethylene, (b) 0.5–10 weight percent of a foaming agent based on the weight of the polyethylene and (c) 1 to 30 weight percent based on the weight of said polyethylene of an additive consisting essentially of oxidized polyethylene having a total chemically combined oxygen content in the range 0.20 to 7.5 weight percent and a complexing agent selected from the group consisting of metal salts and metal complexes, the metal in said complexing agents being at least bivalent, the weight ratio of oxidized polyethylene:complexing agent in the additive being in the range 1:0.01 to 2 respectively, heating said mixture above the melting point of the polyethylene and the decomposition temperature of said foaming agent under pressure in order to form a foamed product, and thereafter cooling said foamed product below the melting point of the polyethylene.

17. A composition useful in the production of an inflammable elastic gel consisting essentially of (a) gasoline, and (b) 1 to 30 weight percent based on the weight of said gasoline of an additive consisting essentially of oxidized polyethylene having a total chemically combined oxygen content in the range 0.20 to 7.5 weight percent and a complexing agent selected from the group consisting of aluminum naphthanate and aluminum palmitate, the weight ratio of oxidized polyethylene:complexing agent in the additive being in the range 1:0.01 to 2 respectively.

18. Biaxially oriented film comprising (a) polyethylene and (b) 1 to 30 weight percent based on the weight of said polyethylene of an additive consisting essentially of oxidized polyethylene having a total chemically combined oxygen content in the range 0.20 to 7.5 weight percent and a complexing agent selected from the group consisting of metal salts and metal complexes, the metal in said complexing agents being at least bivalent, the weight ratio of oxidized polyethylene:complexing agent in the additive being in the range 1:0.01 to 2 respectively.

19. In a pressurized gas process for biaxially orienting polyethylene which comprises heating and holding polyethylene at a set temperature within the range 10° C. below and 100° C. above its melting point and thereafter biaxially orienting said polyethylene by pressurizing said polyethylene with a gas at said set temperature, the improvement whereby said set temperature is broadened to a range of at least 5° C. above and below said set temperature which comprises admixing with said polyethylene prior to biaxially orienting said polymer 1–30 weight percent based on the weight of said polyethylene of an additive consisting essentially of oxidized polyethylene having a total chemically combined oxygen content in the range 0.20 to 7.5 weight percent and a complexing agent selected from the group consisting of metal salts and metal complexes, the metal in said complexing agents being at least bivalent, the weight ratio of oxidized polyethylene:complexing agent in the additive being in the range 1:0.01 to 2 respectively.

References Cited

UNITED STATES PATENTS

| | | | |
|---|---|---|---|
| 3,264,272 | 8/1966 | Rees | 260—78.5 |
| 3,155,644 | 11/1964 | Kehr | 260—94.9 |
| 3,180,750 | 4/1965 | Shippee et al. | 106—270 |
| 3,214,234 | 10/1965 | Bottomley | 8—55 |
| 3,219,619 | 11/1965 | Dickerson | 260—33.6 |
| 3,222,431 | 12/1965 | Greear et al. | 260—897 |
| 3,258,425 | 6/1966 | Burke | 252—17 |
| 3,260,776 | 7/1966 | Lindstrom et al. | 264—95 |
| 3,267,083 | 8/1966 | Imhof | 260—80.5 |

DONALD E. CZAJA, Primary Examiner

R. A. WHITE, Assistant Examiner

U.S. Cl. X.R.

117—138.8, 141; 252—35, 55; 260—2.5, 23, 94.9; 264—95